United States Patent [19]

Raskin

[11] Patent Number: 5,880,271
[45] Date of Patent: Mar. 9, 1999

[54] POLYPHENOLIC DERIVATIVE CHELATING AGENT

[76] Inventor: Mikhail Raskin, 121 Erin Rd., Stoughton, Mass. 02072

[21] Appl. No.: 631,428

[22] Filed: Apr. 12, 1996

Related U.S. Application Data

[63] Continuation-in-part of Ser. No. 349,013, Dec. 2, 1994, abandoned.
[51] Int. Cl.$^6$ .................................................. C07G 1/00
[52] U.S. Cl. ............................................................ 530/500
[58] Field of Search ............................ 562/434; 530/500, 530/502

[56] References Cited

U.S. PATENT DOCUMENTS 5,446,133  8/1995  Detroit .................................... 530/500

*Primary Examiner*—Robert Gerstl
*Attorney, Agent, or Firm*—Brian M. Dingman

[57] ABSTRACT

A polyphenolic-derivative chelating agent derived from lignin, lignin-derived, or lignin-containing materials. The chelating agent is derived by treating the starting material at acidic conditions, followed by oxidative degradation of the acid-treated starting material. The chelating agent has a functional group composition including about 24–29% COOH, about 2.0–3.0% OH(phenolic), and about 17–19% $NO_2$, by weight, and an average molecular weight of at least about 400.

9 Claims, 1 Drawing Sheet

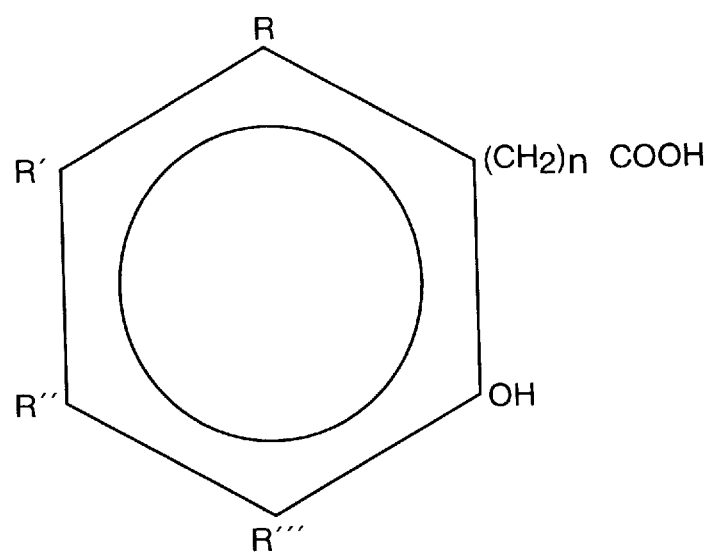

POLYPHENOLIC DERIVATIVE CHELATING AGENT

RELATED APPLICATION

This application is a continuation-in-part of U.S. Ser. No. 08/349,013, filed Dec. 2, 1994, now abandoned entitled "Chelating Agent".

FIELD OF INVENTION

This invention relates to polyphenolic-derivative chelating agents derived from lignin, lignin-derived, or lignin-containing materials.

BACKGROUND OF INVENTION

A chelating agent contains two or more electron donor atoms that can form coordinate bonds to a single metal atom. Chelation is an equilibrium system involving a chelating agent (chelant), the metal, and the chelate. The equilibrium constants of chelation are typically orders of magnitude greater than are those involving complexation of metal atoms by molecules having only one donor atom. Chelating agents, broadly, are used to control metal ion concentrations. Chelates (the chelation complexes) have properties that are different than those of both the chelating agent and the chelated metal ion. Chelating agents can thus be used to reduce undesirable properties of metal ions by sequestration. Alternatively, chelating agents can be used to produce desirable effects, for example in waste water treatment, metal buffering, corrosion inhibition, solubilization, treatment for metal intoxication, and cancer therapy.

There are a large number of chelating agents currently known. A number of known chelating agents are listed in the Kirk-Othmer *Encyclopedia of Chemical Technology*, Fourth Edition, John Wiley and Sons (1991), the chapter entitled "Chelating Agents", Howard, W., and Wilson, D., Vol. 5, at pp. 768–769.

Most of these chelating agents are expensive to produce, usually derived from relatively expensive petroleum-based starting materials, and derived by relatively complex procedures from the starting materials. Accordingly, most chelating agents are not adapted for use in commercial processes requiring an abundant supply of relatively inexpensive chelating agents. Rather, they are suited only for use as analytical reagents.

In addition to the expense of many of the chelating agents, a number of the chelating agents are at most very slightly soluble in water, making them inappropriate, or too expensive, to employ in water-based environments. Additionally, many of the chelating agents are not stable at elevated temperatures of 100° C. or greater, or in high-energy conditions such as in radioactive environments. Additionally, many of the chelating agents are not stable and perform poorly in acidic conditions, and are not oxidation stable. Each of these limitations affects the practical uses of any given chelating agent.

There are a number of situations in which there is a great need for a chelating agent which is inexpensive enough to be used in an industrial process, yet robust enough to withstand elevated temperature/high energy conditions, and/or acidic, and/or oxidizing, conditions. Examples of these types of environments include removal of radioactive materials from low level and high level radioactive liquids. For example, currently much effort is being made to concentrate low level radioactive liquid waste. The metals separation today is typically accomplished by membrane filtration. Spent fuel rods from nuclear power plants are typically cleaned with strong oxidants, such as nitric acid, at pHs of less than one. It would be highly desirable to employ a chelating agent to sequester the radioactive substances from the cleaning solution in order to decrease storage costs. However, most chelating substances are unstable and perform poorly in the highly acidic condition in which this waste exists, and/or are too expensive to be used in such an industrial process.

SUMMARY OF INVENTION

It is therefore an object of this invention to provide a chelating agent which is stable under highly acidic conditions.

It is a further object of this invention to provide such a chelating agent which is stable at high temperatures.

It is a further object of this invention to provide such a chelating agent which is stable under oxidizing conditions.

It is a further object of this invention to provide such a chelating agent which is stable under high energy conditions.

It is a further object of this invention to provide such a chelating agent which can be used to sequester radioactive substances.

It is a further object of this invention to provide such a chelating agent which is relatively inexpensive to produce.

It is a further object of this invention to provide such a chelating agent which is derived from a naturally-occurring, renewable resource.

It is a further object of this invention to provide such a chelating agent which is derived from lignin, lignin-containing materials, or materials derived from lignin.

It is a further object of this invention to provide such a chelating agent which may be produced by a relatively simple process from such lignin-based starting materials.

This invention features a polyphenolic-derivative chelating agent derived from lignin, lignin-derived, or lignin-containing materials, the chelating agent having an atomic makeup of about 44–48% C, about 43–47% O, about 4–6% N, and about 3–5% H, and a functional-group composition including about 24–29% COOH, about 2.0–3.0% OH (phenolic), and about 17–19% $NO_2$, all by weight. The average molecular weight is at least approximately 400.

The chelating agent of this invention is derived from lignin, which is a complex, highly cross-linked naturally-occurring polymer. The chelating agent is produced by condensation of lignin, lignin-derived, or lignin-containing materials, followed by oxidative degredation of the condensed material. Numerous examples of preferred processes are set forth below. The resulting chelating agent is a mixture of oligomers and polymers that are derivatives of polyphenolic carbonic acids. The average molecular weight of the mixture is at least approximately 400 which translates to molecules having at least 3 or 4 of the basic substituted phenol units.

Also featured is a water-soluble aromatic polyphenolic-derivative chelating agent derived from lignin, lignin-derived, or lignin-containing starting materials, by treatment of the starting materials at elevated temperature at acidic conditions, followed at least by oxidative degradation of the acid-treated starting material, the chelating agent having a functional group composition of about 24–29% COOH, about 2.0–3.0% OH (phenolic), and about 17–19% $NO_2$, all by weight, and an average molecular weight of at least about 400.

Featured as well is a polyphenolic-derivative chelating agent derived from lignin, lignin-derived, or lignin-containing starting materials, by treatment of the starting materials with acid at temperatures in the range of 30°–180° C., for 0.5–6.0 hours, followed by a two-step oxidative degradation with an oxidizing substance, the first step being performed at about 30°–50° C. for 0.5–2.0 hours, and the second step being performed at least 80° C. for at least one hour. The second step of the two-step oxidative degradation is preferably performed at 80°–150° C. for 1–6 hours, and under total reflux.

The two-step oxidative degradation is preferably performed at least partially with nitric acid, nitrous oxides, or melange (nitric/sulfuric acid blend) in each step.

Also featured is a polyphenolic-derivative chelating agent derived from lignin, lignin-derived, or lignin-containing starting materials, by treatment of the starting materials at elevated temperature at acidic conditions, followed by oxidative degradation of the acid-treated starting material, also at elevated temperature and acidic conditions.

In another embodiment the invention contemplates a polyphenolic-derivative chelating agent derived from lignin, lignin-derived or lignin-containing starting materials, and having IR absorption bands in the vicinity of 2940 $cm^{-1}$, 1720 $cm^{-1}$, 1440 $cm^{-1}$, and 1220 $cm^{-1}$, with an absorption shoulder in the vicinity of 1640 $cm^{-1}$.

In yet another embodiment, featured is a polyphenolic-derivative chelating agent, derived from lignin, lignin-derived, or lignin-containing materials, which is freely soluble in water, and partly soluble in polar solvents, titrates as a strong acid, is stable in water solution at elevated temperatures in the range of 50° to 100° C., is oxidation resistant, is yellowish to red-brown in color, and is hygroscopic. This chelating agent may have IR absorption bands in the vicinity of 2940 $cm^{-1}$, 1720 $cm^{-1}$, 1440 $cm^{-1}$, and 1220 $cm^{-1}$, with an absorption shoulder in the vicinity of 1640 $cm^{-1}$.

BRIEF DESCRIPTION OF THE DRAWING

Other objects, features and advantages will occur to those skilled in the art from the following description of preferred embodiments and the accompanying drawing, FIG. 1, which is a schematic plane formula drawing of the general structure of one unit of the chelating agent of this invention.

DESCRIPTION OF THE PREFERRED EMBODIMENTS

The chelating agent of this invention is derived from lignin, lignin-derived, or lignin-containing materials. Lignin accounts for 15–36% by weight of vegetative matter. In most industrial processes which use vegetative matter as raw material, such as in the pulp-making industry, the lignin is a waste by-product which adds significantly to the pulp production cost because it must be treated as a waste material. Typically, the lignin in such instances is recovered from solution and burned for its heat content, or for recovery of chemical agents.

The chelating agent of this invention is derived from such starting materials by treatment of the starting materials at elevated temperature at acidic conditions, followed by oxidative degradation of the acid-treated starting material, also at elevated temperature and acid conditions. The first treatment step may take place at from approximately 30° to approximately 180° C., for 0.5 to 6.0 hours. This treatment is preferably accomplished with 0.1% to 5.0% mineral (e.g. hydrochloric) acid. The oxidative degradation preferably is a two-step process, with a first step performed at about 30° C. to about 50° C. for about 0.5 to 2.0 hours with nitric acid at a ratio of from 1:1 through 1:0.1, by weight, of the bone dry starting material to 100% nitric acid. The second oxidation stage is preferably accomplished by diluting the result of the first oxidation stage with water to a final volume which is from three to seven times the end volume of the first stage of oxidation, with the addition of 0.5 to 1 part nitric acid per part of the starting material, and reacting the mixture at at least 80° C. for at least one hour. The step is preferably accomplished by boiling the mixture for three to six hours. The undissolved residue is then filtered off. The filtrate contains the water-soluble chelating agent of this invention.

The chelating agent is a mixture of polyphenolic-derivative oligomers and polymers, with an average molecular weight of at least about 400. Each monomer unit of the chelating agent can be represented by the general form as shown in FIG. 1. The monomer units exhibit great variety within the general form of FIG. 1, although the atomic makeup and functional group composition of the mixture has been characterized.

The functional composition of the chelating agent of FIG. 1 has been experimentally determined to be as follows. n is from 1 to 3. R, R', R'', and R''', are functional groups selected from a group of functional groups including, but not limited to, Aryl, H, $(CH_2)_m COOH$, OH, and $NO_2$, where m is from 0 to 3. The functional group composition of one embodiment of the chelating agent has been determined to include about 24% to 29% COOH, about 2.0% to 3.0% OH (phenolic), and about 17% to 19% $NO_2$, all by weight. The atomic makeup of the agent is about 44% to 48% C, about 43% to 47% O, about 4% to 6% N, and about 3% to 5% H.

EXAMPLES

The following will serve to illustrate particular embodiments of the invention, and manners in which they have been produced.

Example 1

5 gr. of Pepper dioxane lignin [J. Pepper et al *Canad. J.Chem.* 40, 1962, p. 1026 (C=65.12%, H=7.44%, $OCH_3$=17.6%, OHcom.=10.7%, OHbenz.alc.=5.8%, OHphen.=4.27%, C=O=2.28%)] Zakis, G. F. *Function analysis of lignins and its derivatives.* Zinatne.Riga. 1987, was treated with 50 grams of 1% HCl in 100 ml. glass ampules under nitrogen. Soldered ampules were installed into metal vessels contained the same HCl solution and kept 1 hr. at 180° C.

The resulting lignin sample after pounding in a mortar, yielded 88% from the initial substance. This was filtered on a ceramic filter, washed with distilled water until there was no reaction with the Cl⁻ ion, and dried in air. The obtained sample had a composition: C=66.72%, H=4.71%; $OCH_3$=17.48%, OHalc.=6.65%, OHbenz.alc.=1.72%, OHphen.=3.76%, C=O=1.4%.

2 gr. of the prepared sample was mixed with 2.44 ml. 60% $HNO_3$ (density=1.367) in a porcelain plate and kept under a hood for 0.5 hr. The sample was transferred from the plate into a three-neck flask (V=50 ml.). After the addition of 8.6 ml distilled water, the suspension was refluxed for 1 hr. after the addition of 1.22 ml nitric acid (d=1.367).

The sample was cooled, and the insoluble part of the lignin was filtered. This insoluble part contains a higher molecular weight lignin-derived fraction with molecular weights of thousands to hundreds of thousands. This fraction has the same functional groups as the lower molecular weight dissolved fraction, and thus may be used as a chelating agent when dissolved in an alkaline solution.

The solution was extracted with benzene three times for the removal of the nitrophenolic fraction. After separation with benzene, the pH of the solution was adjusted to 3 with NaOH solution.

The formed precipitate was filtered, and the solution was saturated with sodium sulphate and extracted with methyl-ethyl ketone (6 times for 3 ml.). The extract was dried with waterless sodium sulphate, and the solvent was evaporated under vacuum. The obtained residue was treated with hot dioxan (for removing of quinone-nitropolycarbonic acid), washed with ether and dried under vacuum.

Analytical data for the resulting product: C=44%, H=4.1%, N=5.8%, O=46.1%; COOH=25.3%, C=O=4.2%, OHphen=3.0%, OHalk.=3.09%, $NO_2$=18.0% The overall yield was 35% from weight of treated lignin.

The complexability of the product to ferric ion was 30 mg. in 1 ml. of 20% water solution of product (DiatlovaN.M. et al Complexons.Moskva. 1970, p. 416). The average molecular weight of the product was 420, as determined by the method of reverse ebulimetry in acetone.

The initial dioxan-lignin was treated in the same manner, ommiting the condensated sample. Its analysis was: C=60%, H=5.6%, N=2.4%, O=32%. The overall yield was 3% vs initial dioxan-lignin weight.

The complexability to ferric ion was 5 mg in 1 ml of 20% water solution. The molecular weight was 239. For the determination of the kind of functional groups, acid-base properties of the obtained substances were determined, and the thermodynamics of protonization reaction of ionogenic groups was studied.

TABLE 1

Acid-basic properties of oxidates of lignin samples.

| Sample | Equivalent of neutralization mg-equiv./gr | | | $pKa_1$ | $pKa_2$ | $pKa_3$ |
|---|---|---|---|---|---|---|
| | Type 1 | Type 2 | Type 3 | | | |
| Example 1 | 2.8 | 2.6 | 1.6 | 2.0 | 4.8 | 8.4 |
| Example 2 | 3.5 | 2.5 | 1.5 | 2.3 | 4.7 | 8.8 |
| Example 3 | 3.0 | 2.7 | 1.7 | 2.2 | 4.8 | 8.8 |
| Example 4 | 3.4 | 2.6 | 1.2 | 2.3 | 4.9 | 9.0 |

Comparison of obtained data with investigated results of pure model substances showed that monomeric units responsible for the quality of the obtained products are phenolic, benzoic, hydrocumaric, cumarinic, and hydroxybenzoic groups.

The obtained data were confirmed by IR spectroscopy.

Example 2

1000 gr. of hydrolysis wood (a mixture of 30% hardwood and 70% softwood) lignin (Kenig's lignin-73%, ash-0.6%, polysaccharides-17.2%, extractable with ethyl-benzene mixture-8%) was suspended in 3000 ml. of 1% HCl solution and kept stirring for 2 hrs. at 50° C. The resulting lignin sample was filtered, washed with distilled water until there was no reaction with the $Cl^-$ ion, and dried in air to constant weight. The solid lignin sample was mixed with 1220 ml of 60% $HNO_3$ (d=1.367) and kept under a hood at room temperature for 2 hrs.

After the addition of 4 L of distilled water, the suspension was refluxed for 3 hr with even addition of 610 ml of 60% $HNO_3$ during the first two hours of refluxing. The nitrous oxides produced in the reaction were removed in a regeneration system. After cooling of the obtained sample, the insoluble part of the lignin was filtered. This filtrate was treated under the conditions given in Example 1.

Analytical data of the obtained products: C=46.2%, O=4.5%, N=5.2%, H=3.7%; COOH=26.03%, C=O=5.2%, OHphen.=2.9%, OHalk.=3.8%, $NO_2$=17.02%.

Acid-basic qualities are shown in table 1.

Complexing capacity to ferric ion was 40 mg per 1 ml of 20% solution.

The average molecular weight was 380.

The obtained data were confined by IR spectroscopy.

Example 3

A suspension of pine sawdust (100 gr) in 1500 ml of 1% HCl was kept stirring in a stainless vessel, 5 hrs. at 180° C. The obtained residue was filtered, washed with distilled water until there was no reaction with the $Cl^-$ ion, and dried in air to constant weight. The yield was 36% from the initial substance.

10 gr of the obtained residual was mixed with 6.1 ml nitric acid (d=1.37) in a porcelain plate and kept under a hood for 1 hr. at room temperature. The sample was transferred from the plate into a three-neck flask (V=100 ml). After the addition of 50 ml distilled water, the suspension was refluxed for 6 hrs, with the even addition 12.18 ml nitric acid (d=1.37) over the first 4 hrs. Nitrous oxides produced in the reaction were removed in a regeneration system. After cooling of the obtained sample, the insoluble part was filtered. This filtrate was treated under the conditions given in Example 1.

Analytical data of obtained products: C=46.1%, O=45.2%, N=5.3%, H=3.4%; COOH=24.7%, C=O=4.3%, OHphen.=3.21%, OHalk.=4.1%, $NO_2$=17.41%. Acid-basic qualities shown in table 1.

Complexing capacity to ferric ion was 40 mg per 1 ml of 20% solution.

The average molecular weight was 400.

The obtained data were confirmed by IR spectroscopy.

Example 4

100 gr of hydrolysis cotton waste lignin (Kenig's lignin-82.0%, ash-0.8%, polysaccharides-12.8%, extractable with ethyl-benzene-4%, $OCH_3$-4.8%) was suspended in 1000 ml 1% HCl and kept stirring for 2 hrs at 30° C. The sample obtained after filtration, and washing with distilled water and drying (10 gr), was mixed with 11.1 gr melange (containing pure nitric acid, 10.0 gr) and kept under a hood at room temperature for 1 hr. After the addition of 50 ml distilled water, the suspension was refluxed for 4 hrs with even addition of 2.2 gr of melange over the first 2hrs. The obtained filtrate, after cooling, was treated under the conditions given in Example 1.

Analytical data of obtained product: C=46.8%, O=44.8%, N=5.2%, H=3.2%; COOH=26.2%, C=O=4.8%, OHphen.=2.38%, OHalk.=2.2%, $NO_2$=17.08%. Acid-base properties are shown in Table 1.

The average molecular weight was 430.

The yield of the main fraction was 32% vs initial lignin.

Complexing capacity to ferric ion was 42 mg per ml of 20% solution.

Other embodiments will occur to those skilled in the art and are within the following claims:

What is claimed is:

1. A chelating agent derived from lignin, lignin-derived, or lignin-containing starting materials by treatment of said starting materials at elevated temperature at acidic conditions, followed by oxidative degradation of the acid-treated starting material, also at elevated temperature and acidic conditions, the chelating agent having an atomic makeup of about 44–47% C, about 45–46% O, about 5% N, and about 3–4% H, and having the following functional groups: about 25–26% COOH, about 2–3% OH (phenolic), and about 17–18% $NO_2$, all by weight, the chelating agent having an average molecular weight of at least approximately 400.

2. A water-soluble aromatic organic chelating agent derived from lignin, lignin-derived, or lignin-containing starting materials, and produced by treatment of the starting materials at elevated temperature at acidic conditions, followed by oxidative degradation of the acid-treated starting material, the chelating agent having the following functional groups; about 25–26% COOH, about 2–3% OH (phenolic), and about 17–18% $NO_2$, all by weight.

3. The chelating agent of claim 2 in which the average molecular weight is at least approximately 400.

4. A chelating agent derived from lignin, lignin-derived, or lignin-containing starting materials, and produced by treatment of the starting materials with acid at temperatures in the range of 30°–180° C., for 0.5–6.0 hours, followed by a two-step oxidative degradation with an oxidizing substance, the first step being performed at about 30°–50° C. for 0.5–2.0 hours, and the second step being performed at least 80° C. for at least one hour, the chelating agent having an average molecular weight of at least approximately 400.

5. The chelating agent of claim 4 in which the second step of the two-step oxidative degradation is performed at 80°–150° C. for 1–6 hours.

6. The chelating agent of claim 5 in which the second step takes place under total reflux.

7. The chelating agent of claim 4 in which the oxidizing substance in each step includes nitric acid.

8. The chelating agent of claim 7 in which at least one step of the two step oxidative degradation is performed with a mixture of sulphuric acid and nitric acid.

9. The chelating agent of claim 4 in which the oxidizing substance in at least one step includes nitrous oxides.

* * * * *